(12) United States Patent
Honglei et al.

(10) Patent No.: US 11,026,367 B2
(45) Date of Patent: Jun. 8, 2021

(54) GARDEN TOOLS

(71) Applicant: Suzhou Cleva Precision Machinery & Technology Co., Ltd., Suzhou (CN)

(72) Inventors: Zhuo Honglei, Suzhou (CN); Wang Fudong, Suzhou (CN); Yin Weirui, Suzhou (CN); Gong Maoqiang, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 20 days.

(21) Appl. No.: 16/545,269

(22) Filed: Aug. 20, 2019

(65) Prior Publication Data
US 2020/0053959 A1 Feb. 20, 2020

(30) Foreign Application Priority Data

Aug. 20, 2018 (CN) .......................... 201821343912.9

(51) Int. Cl.
*A01D 34/416* (2006.01)
*A01D 69/00* (2006.01)
*F02N 11/08* (2006.01)
*F02B 63/02* (2006.01)

(52) U.S. Cl.
CPC ........... *A01D 34/416* (2013.01); *A01D 69/00* (2013.01); *F02B 63/02* (2013.01); *F02N 11/087* (2013.01); *F02N 11/0862* (2013.01)

(58) Field of Classification Search
CPC ....... A01D 34/416; A01D 69/00; F02B 63/02; F02N 11/0862; F02N 11/087

USPC ............. 30/276, 277.4, 296, 298, 347, 286; 56/12.7

See application file for complete search history.

(56) References Cited

U.S. PATENT DOCUMENTS

| 2,659,780 | A | * | 11/1953 | Berger | ..................... H01H 3/20 200/43.18 |
| 7,584,804 | B2 | * | 9/2009 | Fukuzumi | ............ A01B 33/028 172/119 |
| 2003/0192188 | A1 | * | 10/2003 | Nagashima | ............. F16D 49/08 30/276 |
| 2010/0313430 | A1 | * | 12/2010 | Yamaoka | ............. A01D 34/828 30/276 |

(Continued)

FOREIGN PATENT DOCUMENTS

| CN | 302599451 S | 10/2013 |
| CN | 303181563 S | 4/2015 |

(Continued)

*Primary Examiner* — Phong H Nguyen
(74) *Attorney, Agent, or Firm* — JK Intellectual Property Law, PA

(57) ABSTRACT

A garden tool includes a power assembly comprising an internal combustion engine having a starter motor; a battery pack for supplying power to the starter motor; a connecting rod assembly having two ends; a working head assembly, the working head assembly and the power assembly being respectively arranged at the two ends of the connecting rod assembly; and a handle assembly including two handles. One of the handles is on a left side of the connecting rod assembly, and another of the handles is on a right side of the connecting rod assembly. The battery pack is detachably assembled on at least one of the handles.

8 Claims, 11 Drawing Sheets

(56) References Cited

U.S. PATENT DOCUMENTS

| | | | |
|---|---|---|---|
| 2011/0203118 A1* | 8/2011 | Saito | A01D 34/78 30/276 |
| 2013/0111865 A1* | 5/2013 | Hansen | A01D 34/828 56/11.3 |
| 2013/0186051 A1* | 7/2013 | Ran | A01D 34/84 56/16.9 |

FOREIGN PATENT DOCUMENTS

| | | |
|---|---|---|
| JP | 2011097837 A | 5/2011 |
| WO | WO 2014119116 A1 | 8/2014 |

* cited by examiner

GARDEN TOOLS

CROSS-REFERENCE TO RELATED PATENT APPLICATIONS

This application claims priority to CN Patent Application No. 201821343912.9, filed on Aug. 20, 2018. That application is hereby incorporated by reference in its entirety.

TECHNICAL FIELD

The present disclosure relates to a garden tool, and particularly to a garden tool having an electric started engine.

BACKGROUND

In garden tools, especially electric starting engine mowers, the common structure is that the battery pack and the engine are placed in the same place. The mower uses a gasoline engine as the power source and is provided with an electric starting system. The battery pack and the circuit board are both mounted on the engine mechanism so as to conveniently supply power to the electric starting system. However, during the use of the mower, the engine will produce vibration and generate a large amount of heat, and will also exhaust the waste gas. All of the above may affect the battery pack and the control panel, leading to the failure of the mower and affecting the service life thereof. If there is an accident, since the engine and the battery pack are placed behind the operator, it is difficult to detect and respond in time, increasing the risk factor.

SUMMARY

The technical problem to be solved by the disclosed subject matter is to provide a handle assembly, wherein the battery pack is provided on the handle assembly, and is convenient to install and reliable to use.

To solve the above technical problem, the present disclosure provides a garden tool, comprising a power assembly including an internal combustion engine having a starter motor; a battery pack for supplying power to the starter motor; a connecting rod assembly; a working head assembly, the working head assembly and the power assembly being respectively arranged at two ends of the connecting rod assembly; and a handle assembly, including handles respectively provided on the left and right sides of the connecting rod assembly, wherein the handles include grip portions, at least one handle includes a grip portion and a battery pack mounting portion, and the battery pack is detachably connected with battery pack mounting portion.

Further, the battery pack mounting portion comprises an accommodating chamber, and the battery pack is mounted on the battery pack mounting portion by being at least partially received in the accommodating chamber; the accommodating chamber is provided with an opening, and the opening faces forward.

Further, the garden tool further comprises a circuit board disposed adjacent to the accommodating chamber, wherein the circuit board comprises a substrate and an electrode holder disposed on the side of the substrate facing the accommodating chamber; the electrode holder is provided with a clamping pin extending into the accommodating chamber.

Further, the upper end of the grip portion of at least one of the handles is provided with a control portion, and the control portion includes at least one control key.

Further, the control portion comprises an operation portion, and the control key is arranged on the operation portion; the control key includes a start key, and the operation portion further includes a cover body capable of at least partially shielding the start key from being operated, the cover body being configured to be openable under drive of external force so that the start key can be operated.

Further, the cover is pivotally connected with the operation portion, and a reset element is provided between the cover body and the operation portion, the reset element making the cover body tend to move to a state of shielding the start key.

Further, the handle assembly comprises a left handle arranged on the left side of the connecting rod assembly and a right handle arranged on the right side of the connecting rod assembly; the right handle includes a control portion and a battery pack mounting portion.

Further, a front shield plate is provided at interval in front of the grip portion of the right handle, and a gap for the hand of an operator to pass through is formed between the grip portion and the front shield plate.

Further, the control portion is connected to the upper end of the grip portion, and the battery pack mounting portion is connected to the lower end of the grip portion.

According to other aspects of the disclosure, a garden tool comprises a power assembly comprising an internal combustion engine having a starter motor; a battery pack for supplying power to the starter motor; a connecting rod assembly; a working head assembly, the working head assembly and the power assembly being respectively arranged at two ends of the connecting rod assembly; and a handle assembly, including handles respectively provided on the left and right sides of the connecting rod assembly, wherein the battery pack is detachably assembled on at least one of the handles.

The technical effect that can be achieved by the present disclosure is that the battery pack is disposed on the handle assembly, and the operation portion is also disposed on the handle assembly, so that the tool can be operated while being held, and the battery pack, the circuit board and the operation portion are arranged together so that the trouble of wiring is reduced, the assembly is simpler and more convenient, the cost is low, and the use is reliable. And the mounting position of the battery pack can be selected according to the preference of an operator or the operation requirement.

Figure 1:
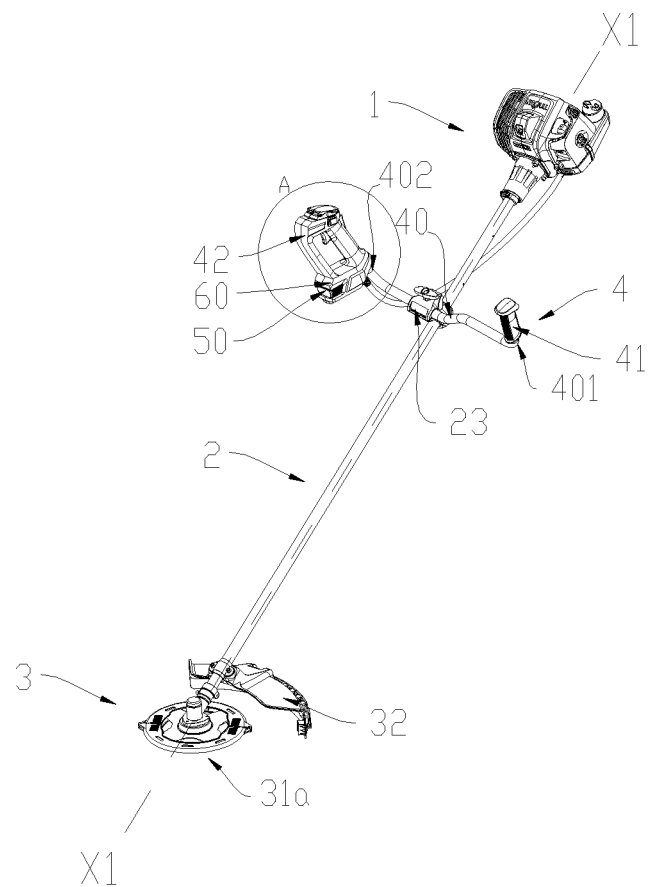
FIG. 1 is a schematic structural view of the garden tool provided in Embodiment 1.

In the drawings the following reference numerals are used:

1—power assembly;
2—connecting rod assembly; 21—rear connecting rod; 22—front connecting rod; 23—fastening means; 24—drive shaft;
3—working head assembly; 31a—cutter head; 31b—grass cutting head; 32—shield;
4—handle assembly; 40—handle crossbar; 401—handle left lever; 402—handle right lever; 41—left handle; 42—right handle; 421—grip portion; 422—operation portion; 422a—operating portion top surface; 422b—first shaft; 423—cover body; 4231—shaft hole; 4232—torsion spring; 424—start key; 425—flameout key; 426—self—locking key; 427—throttle key; 428—front shield plate;
50—battery pack; 51—upper cover; 52—lower cover; 53—battery cell; 55—groove; 511 charging port; 512—charging electrode; 521—first battery terminal; 522—second battery terminal; 523—third battery terminal; 525—rubber cover; 526—guiding groove; and
60—battery pack mounting portion; 61—accommodating chamber; 611—opening; 61a—front chamber; 61b—rear chamber; 62—housing; 63—circuit board; 631—substrate; 632—electrode holder; 632a—body; 632b—clamping pin; 6321—first clamping pin terminal; 6322—second clamping pin terminal; 64—operating key; 641—pressing portion; 642—hook portion; 643—rotating shaft; 644—reset element; 651—third chamber terminal.

DETAILED DESCRIPTION

The disclosed subject matter will be described in detail below with reference to specific embodiments shown in the accompanying drawings. However, these embodiments are not intended to limit the present invention, and structural, methodological, or functional changes made by a person skilled in the art based on these embodiments are intended to be included within the scope of the present invention.

It is to be understood that in the description of the specific embodiments of the present invention, the terms "first," "second," and the like are used for descriptive purposes only and are not to be construed as indicating or implying a relative importance or implying a number of features indicated. Thus, a feature defined as "first" or "second" may expressly or implicitly includes one or more of the feature.

In the specific embodiments of the present disclosure, unless otherwise expressly specified and defined, the terms such as "interconnected", "connected" and the like should be broadly interpreted, and may be, for example, fixedly connected, movably connected, detachably connected, or integrated; can be directly connected or indirectly connected through an intermediate medium; may be a communication inside two elements or an interaction of the two elements. To those of ordinary skill in the art, the specific meanings of the above terms in the present disclosure can be understood according to the specific circumstances.

In the specific embodiments of the present invention, unless otherwise expressly specified and defined, reference to a first feature being "on" or "under" a second feature may means that the first feature directly contact the second feature, or may means that the first feature does not directly contact the second feature but contact through another feature therebetween.

In the specific embodiments of the present embodiments, unless otherwise expressly specified and defined, the term "plurality" refers to two or more.

In the present embodiment, provided is a garden tool, comprising a power assembly 1, a connecting rod assembly 2, a working head assembly 3 and a handle assembly 4, wherein the handle assembly 4 comprises a left handle 41 and a right handle 42 which are arranged on the left side and the right side of the connecting rod assembly 2. When using the garden tool, the operator controls and manipulates the garden tool by simultaneously holding the left handle 41 with the left hand and the right handle 42 with the right hand. Furthermore, the connecting rod assembly 2 is further provided with a strap for an operator to straddle the shoulder to reduce the force on the arm of the operator. Specifically, the handle assembly 4 is configured in a U-shape, a horn-shape, or other similar shape. As a specific embodiment of the present disclosure, the handle assembly 4 is configured in a U-shape.

In the present embodiment, the axial direction X1 of the connecting rod assembly 2 is defined as the front-rear direction. When using the garden tool, the working head assembly 3 is far away from a human body relative to the power assembly 1, therefore the extending direction of the working head assembly 3 is defined as 'front', and the extending direction of the power assembly 1 is defined as 'rear'; the direction perpendicular to the axis direction X1 and having the largest included angle with the ground is the up-down direction, wherein the direction deviating from the ground is "up" and the direction facing the ground is "down"; the extending direction perpendicular to the front-rear direction and perpendicular to the up-down direction is the left-right direction, and when the human body faces the front, the direction in which the right hand is located is the right direction, and the direction in which the left hand is located is the left direction.

The power assembly 1 is connected to the rear end of the connecting rod assembly 2; the working head assembly 3 is connected to the front end of the connecting rod assembly 2; the U-shaped handle assembly 4 is connected to the middle of the connecting rod assembly 2, and generally, since the mass of the power assembly 1 is relatively large, compared with the working head assembly 3, the distance between the U-shaped handle assembly 4 and the power assembly 1 is shorter, so that the U-shaped handle assembly 4 is more labor-saving when being held for operation.

The power assembly 1 includes a compact internal combustion engine and a starter motor for starting the internal combustion engine. As one specific embodiment of the present disclosure, the internal combustion engine is a gasoline engine.

The working head assembly 3 includes a working member 31a and a shield 32. Wherein the working member 31a is mounted at the front end of the connecting rod assembly 2; the shield 32 is mounted on the connecting rod assembly 2 and located behind the working member 31a. In some embodiments, the working member 31a is a cutter head, in which case the garden tool is configured as a brush cutter; in some embodiments, the working member 31a is a straw rope, in which case the garden tool is configured as a grass trimmer. Of course, in other embodiments, the garden tool can also be configured as a pole saw, pruner, etc. by replacing the working member 31a by a person skilled in the art.

In the present embodiment, the U-shaped handle assembly 4 is mounted to the rear half of the connecting rod assembly 2 relatively close to the power assembly 1 for gripping during use. The U-shaped handle assembly 4 includes a handle crossbar 40 extending generally in a left-right direction and connected to the connecting rod assembly 2 by a fastening means 23; the left end of the handle crossbar 40 extends leftwards and upwards to form a handle left bar 401, and the left handle 41 is mounted at the upper end of the handle left bar 401; the right end of the handle crossbar 40 extends rightwards and upwards to form a handle right bar 402, and the right handle 42 is mounted at the upper end of the handle right bar 402. Further, in some embodiments, the U-shaped handle assembly 4 is selectively movable forward or rearward with the handle crossbar 40 as an axis, which can meet the comfortable operation requirements of users with different heights/arm lengths.

The U-shaped handle assembly 4 is provided with control keys for controlling the garden tool. The control keys include, but not limited to, a start key 424, a flameout key 425, a self-locking key 426, a throttle key 427, etc., which are all provided on the right handle 42 and are arranged on the principle of facilitating right hand grip and operation. Specifically, the start key 424 is configured as an automatically resettable button switch, and the flameout key 425 is configured as an automatically resettable boat type switch.

In the present embodiment, the garden tool further comprises a battery pack 50 configured to be detachably mounted on the U-shaped handle assembly 4. The battery pack 50 is mainly used to supply power to the starter motor of the electric starter system and is discharged only when the gasoline engine is started. In some embodiments, the battery pack 50 may also power an electronic control system of the gasoline engine, such as an electronic ignition system, an electronic fuel injection system, an electric throttle system, an automatic throttle system, and the like. In some embodiments, the battery pack 50 may be charged while the gasoline engine is operating.

The battery pack 50 is detachably connected to the U-shaped handle assembly 4 through a battery pack mounting portion 60, specifically, the battery pack mounting portion 60 is provided on the left handle 41 and/or the right handle 42, and the battery pack 50 is assembled into the battery pack mounting portion 60. The battery pack mounting portion 60 is provided at various positions of the left handle 41 and/or right handle 42, so that the battery pack 50 can be plugged into the battery pack mounting portion 60 from different directions, and the battery pack 50 can be easily and quickly mounted and dismounted.

Specifically, the battery pack mounting portion 60 is mainly constructed as a semi-enclosed structure having an accommodating chamber 61, the opening 611 of the accommodating chamber 61 faces differently, and the battery pack 50 is also respectively corresponding to different mounting directions. The battery pack 50 can be plugged into the U-shaped handle assembly 4 from any direction, such as up, down, left, right, front, and rear, and the user can select the mounting direction of the battery pack 50 according to his or her preference or needs.

The battery pack 50 is arranged on the U-shaped handle assembly 4, so that the battery pack 50 is far away from the power assembly 1, thereby avoiding the adverse effect of the large amount of heat generated by the engine working in the power assembly 1 on the battery pack 50, ensuring the performance and the safety of the battery pack 50, and also prolonging the actual service life; and the battery pack 50 is arranged on the U-shaped handle assembly 4, compared to being arranged on the power assembly 1, the volume of the engine is reduced, and a part of weight is transferred to the middle part of the garden tool, so that the weight distribution of the garden tool is more reasonable; in addition, the battery pack 50 is arranged on the U-shaped handle assembly 4, so that the battery pack 50 can be completely exposed in the sight range of the operator, and if accidents happen, the operator can quickly respond to make corresponding measures to reduce damage.

Embodiment 1

Figure 2:
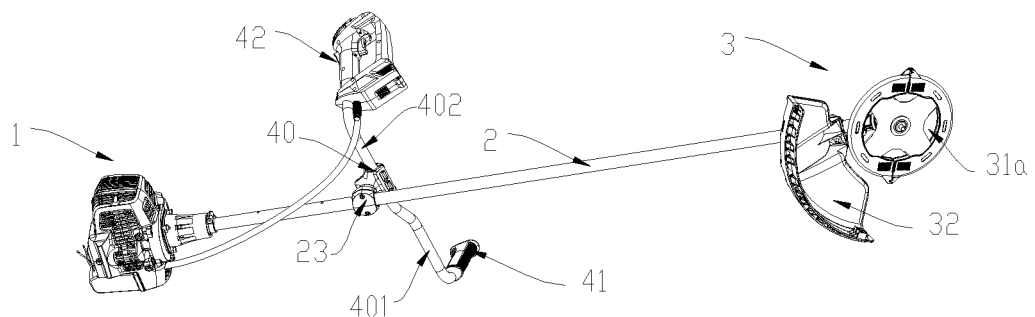
FIG. 2 is a schematic structural view of another perspective of the garden tool provided in Embodiment 1.

The structure of the U-shaped handle assembly 4 is described in the following. As shown in FIGS. 1 to 2, in the present embodiment, the connecting rod assembly 2 is made of rigid material, the front end of the connecting rod assembly 2 is connected to the working head assembly 3, and the rear end of the connecting rod assembly 2 is connected to the power assembly 1. In the present embodiment, the working member 31a is a cutter head, and the garden tool is configured as a brush cutter. The U-shaped handle assembly 4 is arranged on the connecting rod assembly 2 by the fastening means 23. The battery pack 50 is detachably mounted on the right handle 42 and plugged into the battery pack mounting portion 60 from front to rear. The right handle 42 is approximately in a shape of a D, and a control portion is arranged at the upper end of the right handle 42 and comprises at least one control key; the battery pack mounting portion 60 is disposed below the right handle 42, the battery pack mounting portion 60 is integrally disposed with the right handle 42, the opening 611 of the accommodating chamber 61 faces forward, and the battery pack 50 is plugged into the battery pack mounting portion 60 from front to rear; the front of the right handle 42 is configured as a front shield plate 428, which may be eliminated in some embodiments; and the rear portion of the right handle 42 is configured as a grip portion 421.

The plugging mode of the battery pack 50 and the battery pack mounting portion 60 will be described in detail below by taking Embodiment 1 as the example. Referring to FIGS. 3 to 10, the battery pack mounting portion 60 includes a battery pack mounting structure including the accommodating chamber 61 for mounting the battery pack 50 and a circuit board 63 disposed above the accommodating chamber 61. The circuit board 63 has functions of controlling a starter motor, protecting a battery, and the like. Wherein the accommodating chamber 61 is formed by a housing 62 in a half-enclosed manner, and the circuit board 63 is arranged in the housing 62 forming the accommodating chamber 61. The circuit board 63 comprises a substrate 631, electronic elements arranged on the upper surface of the substrate 631 and an electrode holder 632 arranged on the lower surface of the substrate 631. The electrode holder 632 is provided with a body 632*a* fixed on the substrate 631 and clamping pins 632*b* extending downwards along both ends of the body 632*a*, wherein the clamping pins 632*b* extend into the accommodating chamber 61. The battery pack 50 is arranged in the accommodating chamber 61 and is matched with the clamping pins 632*b* to realize the electric connection with the circuit board 63.

The front of the accommodating chamber 61 is provided with an opening 611. The accommodating chamber 61 may be divided into a front chamber 61*a* communicating with the opening 611, and an opposite rear chamber 61*b*. The clamping pin 632*b* extends into the rear chamber 61*b*, and when mounting the battery pack 50, the clamping pin 632*b* is plugged into the front chamber 61*a* from the opening 611 and then enters the rear chamber 61*b*. In order to facilitate the assembly and disassembly of the battery pack 50, the front chamber 61*a* has an opening portion communicating with the outside in a direction perpendicular to the mounting direction of the battery pack 50, wherein the battery pack 50 is mounted inside the accommodating chamber 61, and a part of the side wall of the battery pack 50 is exposed from the opening portion. In the present embodiment, specifically, the front portions of the left and right side walls of the accommodating chamber 61 are not provided with solid side walls, so that the front ends of the left and right side walls of the battery pack 50 are easily gripped in the state of assembly or disassembly. In addition, the front ends of the left and right side walls of the battery pack 50 may be provided with rubber cover 525, so that the battery pack 50 can be conveniently grasped and prevented from being accidentally collided.

Referring to FIGS. 6 to 9, the clamping pins 632*b* at both ends of the body 632*a* of the electrode holder 632 are correspondingly provided with a first clamping pin terminal 6321 and a second clamping pin terminal 6322 protruding into the accommodating chamber 61, and the battery pack 50 is provided with a first battery terminal 521 and a second battery terminal 522 which are respectively matched with the first clamping pin terminal 6321 and the second clamping pin terminal 6322. The first battery terminal 521 and the second battery terminal 522 are configured as positive and negative electrodes of the battery pack 50, which are respectively provided at both sides of the end of the battery pack 50, since the first clamping pin terminal 6321 and the second clamping pin terminal 6322 are connected to the substrate 631 through the body 632*a*, and when the battery pack 50 is mounted to the accommodating chamber 61, the first clamping pin terminal 6321 is electrically connected to the first battery terminal 521, and the second clamping pin terminal 6322 is electrically connected to the second battery terminal 522, thereby achieving the electrical connection between the battery pack 50 and the circuit board 63.

Figure 8:
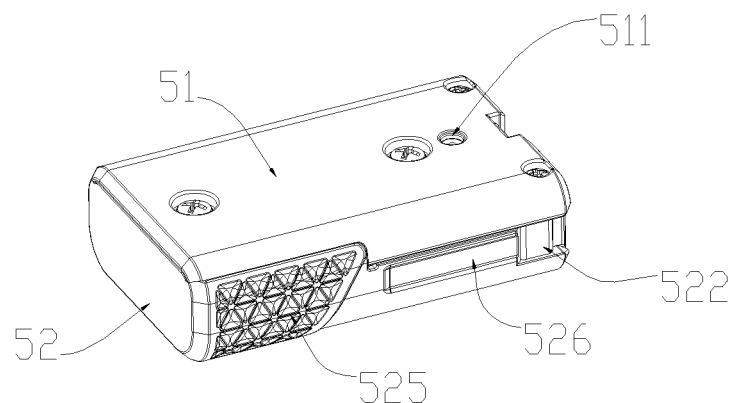
FIG. 8 is a perspective view of the battery pack in FIG. 3.

Further, as shown in FIG. 8, the left and right side walls of the accommodating chamber 61 are respectively provided with guiding protrusions (not shown) protruding into the accommodating chamber 61, and the left and right sides of the battery pack 50 are correspondingly provided with guiding grooves 526. The battery pack 50 is guided and mounted into the accommodating chamber 61 through the cooperation of the guiding grooves 526 and the guiding protrusions, wherein the guiding grooves 526 on the two sides respectively correspond to the positions of the first battery terminal 521 and the second battery terminal 522, so that the mount of the battery pack 50 is more reliable. In addition, the battery pack 50 includes the upper cover 51 and the lower cover 52 assembled together and battery cells 53 located inside the upper cover 51 and the lower cover 52. The upper cover 51 is provided with a charging port 511, and the lower cover 52 is correspondingly provided with a charging electrode 512. In this way, charging and discharging are set separately to facilitate the standardization of charging interface and make charging more convenient.

Figure 9:
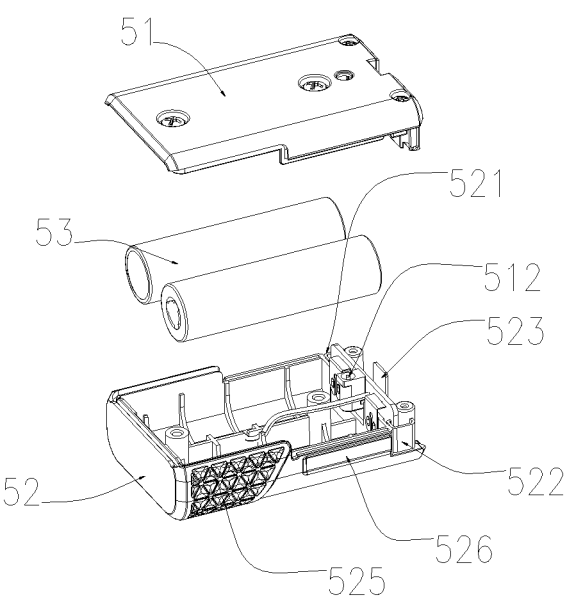
FIG. 9 is an exploded perspective view of the battery pack of FIG. 8.
Figure 10:
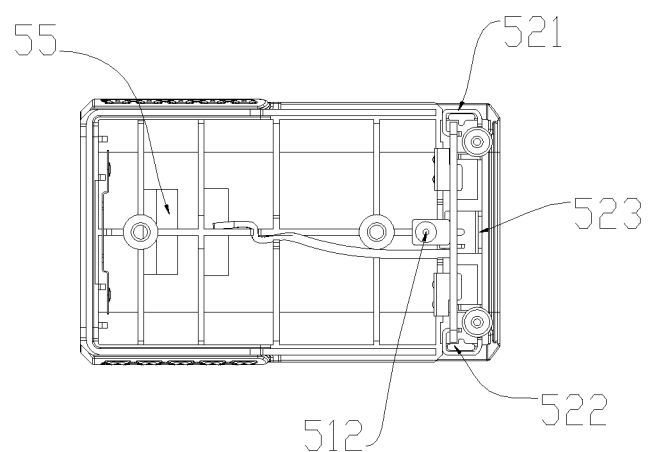
FIG. 10 is a schematic top view of the lower cover of the battery pack in FIG. 8.

Referring to FIG. 9, the arrangement direction of the battery cells 53 is the same as the mounting direction of the battery pack 50. In the present embodiment, the arrangement direction of the battery cells 53 is along the front-rear direction. The battery cells 53 comprises at least two cells, and the first battery terminal 521 and the second battery terminal 522 are respectively disposed on the left and right sides of the battery pack 50, so that the battery pack 50 and the mounting structure thereof are thinner, thereby reducing the overall volume of the right handle 42. In the present embodiment, the rear wall of the accommodating chamber 61 is provided with a third chamber terminal 651, and the end of the corresponding battery pack 50 adjacent to the first battery terminal 521 and the second battery terminal 522 is provided with a third battery terminal 523 matched with the third chamber terminal 651. The circuit board 63 is connected to a detection module in the battery pack 50, for example, a temperature measurement module in the battery pack 50, through the third chamber terminal 651 and the third battery terminal 523. In the present embodiment, since the battery pack is discharged only at the start-up stage of the gasoline engine and does not need an excessively large capacity, the battery pack 50 includes only two battery cells 53, thereby sufficiently reducing the size of the battery pack 50.

Figure 4:
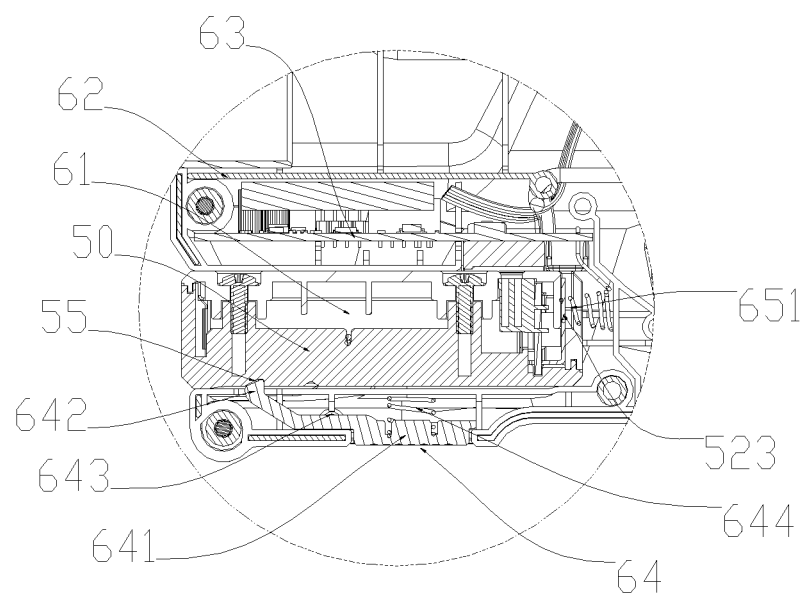
FIG. 4 is a sectional view of position C-C in FIG. 3, and the battery pack is in a locked state.
Figure 5:
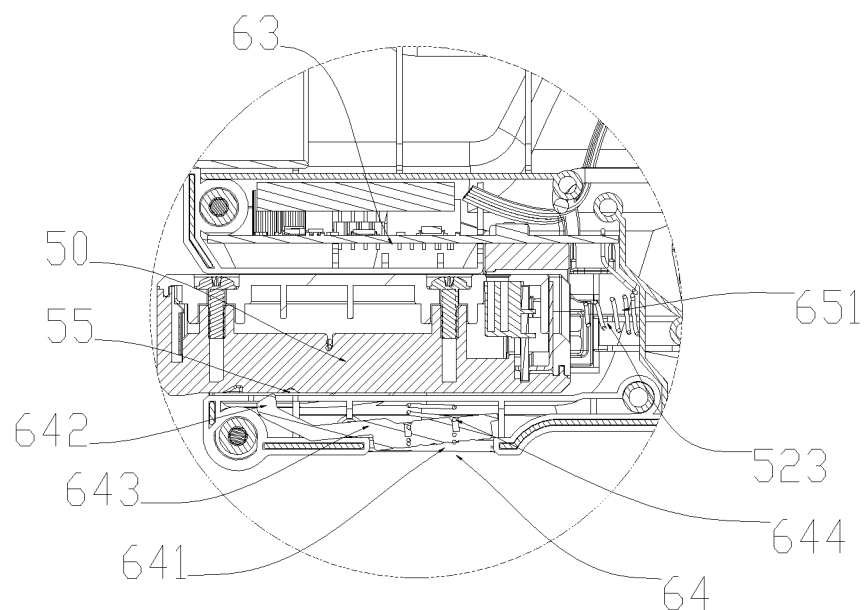
FIG. 5 is a sectional view of position C-C in FIG. 4, and the battery pack is in an unlocked state.
Figure 6:
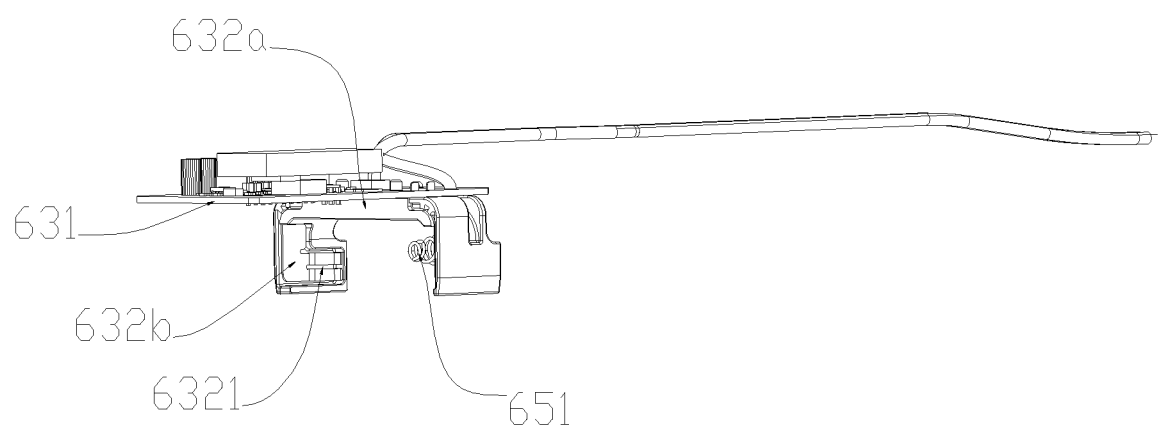
FIG. 6 is a perspective view of the circuit board of the handle assembly in FIG. 3.
Figure 7:
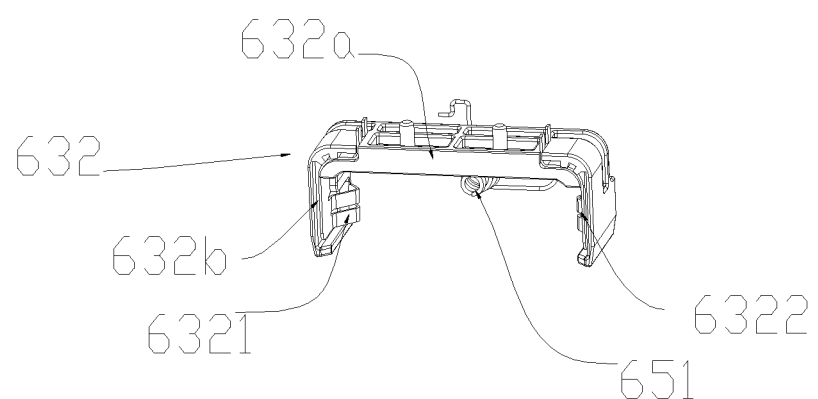
FIG. 7 is a perspective view of the electrode holder in the circuit board of FIG. 6.

Referring to FIGS. 4 and 5, in order to realize locking the battery pack 50 in the accommodating chamber 61, the battery pack mounting structure further includes an operating mechanism. The operating mechanism is disposed at the lower portion of the accommodating chamber 61. The operating mechanism includes an operating key 64 and a reset element 644 pressing against the operating key 64, the battery pack 50 is provided with a groove portion 55 matched with the operating key 64, and the operating key 64 is clamped with the groove portion 55 under the action of the reset element 644, so as to lock the battery pack 50 in the accommodating chamber 61. Specifically, the operation key 64 includes a hook portion 642 clamped with the groove portion 55, a pressing portion 641 away from the hook portion 642, and a rotating shaft 643 located between the hook portion 642 and the pressing portion 641. The reset element 644 presses the pressing portion 641 outward, and the hook portion 61 is inward and maintained in being clamped with the groove portion 55 under the action of the rotating shaft 65, so that the battery pack 50 is locked with respect to the accommodating chamber 61.

When needing to disassemble the battery pack 50, the pressing portion 641 is forced inward, the pressing portion 641 overcomes the acting force of the reset element 644 and simultaneously pivots under the action of the rotating shaft 643 to drive the hook portion 642 to be separated from the groove portion 55, so that the battery pack 50 is unlocked relative to the accommodating chamber 61. In order to take out the battery pack 50, the rear wall of the accommodating chamber 61 is provided with an elastic element, the battery pack 50 is mounted in the accommodating chamber 61, and the elastic element is compressed; when the battery pack 50 is unlocked, the elastic force of the elastic element is released, that is, the battery pack 50 is ejected out of the accommodating chamber 61 under the action of the elastic element, so that the battery pack 50 can be disassembled by one hand. In the present embodiment, preferably, the third chamber terminal 651 and the elastic element may be constructed as the same element, such as a spring, thereby facilitating assembly to reduce cost. Of course, the elastic element and the third chamber terminal 651 may be separately provided according to actual needs.

In addition, when the battery pack 50 is not mounted, the hook portion 642 protrudes toward the inside of the accommodating chamber 61 under the action of the reset element 644, and in order to realize mounting the battery pack 50 by one hand, one surface of the hook portion 642 facing the opening 611 of the accommodating chamber 61 is configured as a guide surface, and the guide surface may be a surface such as an inclined surface, an arc surface, or a curved surface that can make the force of the battery pack 50 moving toward the inside of the accommodating chamber 61 generate a downward component force. As the battery pack 50 moves toward the inside of the accommodating chamber 61, the hook portion 642 moves outward and drives the pressing portion 641 to overcome the action of the reset element 644 through the rotating shaft 643, so that the battery pack 50 is smoothly mounted into the accommodating chamber 61. When the groove portion 55 corresponds to the position of the hook portion 642, the hook portion 642 is clamped into the groove portion 55 under the action of the reset element 644, so as to achieve the lock of the battery pack 50. In the present embodiment, the reset element 644 is preferably a compression spring, one end of which abuts against the housing and the other end of which abuts against the pressing portion 641. Of course, the compression spring may also be configured to abut against the hook portion 642, and the reset element 644 may also be configured as a torsion spring, wherein the torsion spring may be sleeved on the rotating shaft 643, one end of the torsion spring is fixed relative to the housing, and the other end of the torsion spring abuts against the pressing portion 641 or the hook portion 642.

Figure 11:
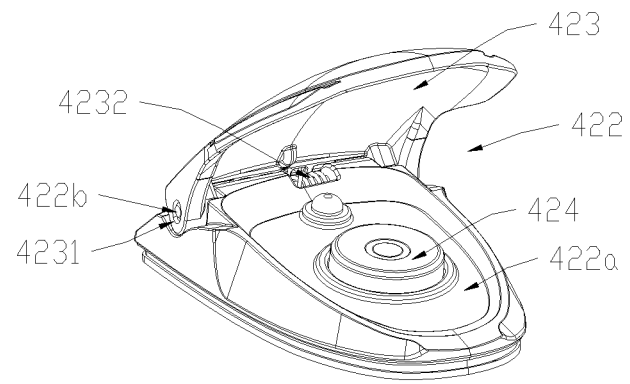
FIG. 11 is a perspective view of the operating portion of the handle assembly in FIG. 1, and the cover body is in an open state.

As shown in FIG. 11, the right handle 42 includes a grip portion 421 and a control portion, and in the present embodiment, the control portion includes an operation portion 422 having an operation portion top surface 422a. The control key is provided in the operation portion 422, and at least two steps are required to implement the machine start in order to meet the safety specification requirements. The U-shaped handle assembly 4 is provided with a cover body 423 capable of at least partially shielding the start key 424 from being operated, and the cover body 423 can be opened under the driving of external force so as to be able to operate the start key 424. Specifically, one side of the cover body 423 is hinged to the operation portion top surface 422a. In a natural state, the cover body 423 shields the start key 424 from direct contact with the start key 424. When needing to operate the start key 424, it is need to open the cover body 423 first and keep the cover body 423 in an open state, so that the start key 424 can be operated. In the present embodiment, the operation portion 422 is only provided with the start key 424, the cover body 423 cooperating with the start key 424, the flameout key 425, the self-locking key 426, and the throttle key 427, and it is possible to operate all functions of the brush cutter and to satisfy safety regulations without providing any additional key or protection device.

The cover body 423 is rotatably connected to the right handle 42. One end of the operation portion top surface 422a, which is far away from the rear half portion of the grip portion 421, is provided with a first shaft 422b, one end of the cover body 423 is provided with a shaft hole 4231, and the first shaft 422b is matched with the shaft hole 4231 to enable the cover body 423 to be pivotally connected to the operation portion 422. Further, the maximum opening angle of the cover body 423 is limited to 60°, that is, the opening angle of the cover body 423 is 0° to 60°.

Figure 3:
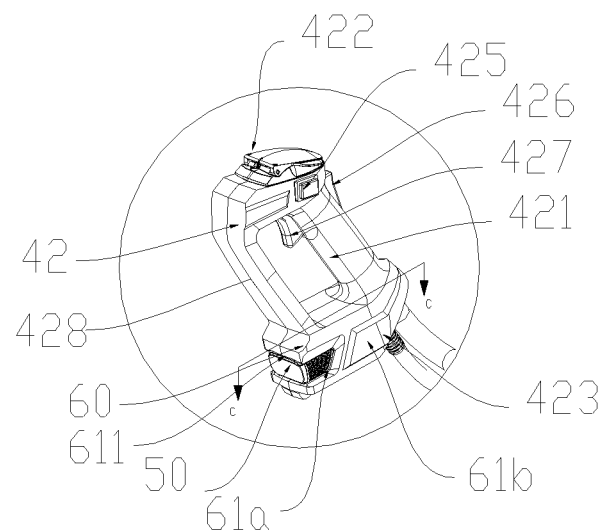
FIG. 3 is an enlarged view showing the structure of area A in FIG. 1.

A reset element is disposed between the cover body 423 and the right handle 42, and the reset element make the cover body 423 tend to move to a state of shielding the start key 424. In the present embodiment, the reset element is an elastic element. Specifically, the elastic element is located between the cover body 423 and the operation portion 422, and the elastic element enables the cover body 423 to be snap-fitted to the start key 424. Specifically, the elastic element is configured as a torsion spring 4232 sleeved on the first shaft 422b, one end of the torsion spring 4232 abuts against the cover body 423, and the other end of the torsion spring 4232 abuts against the operation portion 422. In a natural state, the cover body 423 is in a close state under the action of the torsion spring 4232, as shown in FIG. 3, the start key 424 is hidden under the cover body 423 and cannot be directly operated, so that the garden tool is prevented from being unintentionally actuated. When needing to start the garden tool needs, a force which enables the free end of the cover body 423 to rotate in the direction away from the top surface 422a of the operation portion is applied to the cover body 423 by using a thumb or other external force, the cover body 423 is jacked up against the elastic force of the torsion spring 4232, so that the cover body 423 is in an open state, as shown in FIG. 11, then the thumb is rapidly plugged into the cover body 423, the start key 424 is pressed, so that the micro switch arranged below the start key 424 is activated, the control key is electrically connected with the power assembly 1, and further the starter motor is powered to start, thereby driving the crankshaft of the engine to rotate, and starting the engine. When the thumb is drawn out from below the cover body 423 in the open state, the cover body 423 is restored to the close state due to the elastic restoring force of the torsion spring 4232. In other embodiments, the control keys may be provided on the left handle and arranged on the principle of facilitating left hand operation in order to meet the needs of the left-handed population.

Embodiment 2

Figure 12:
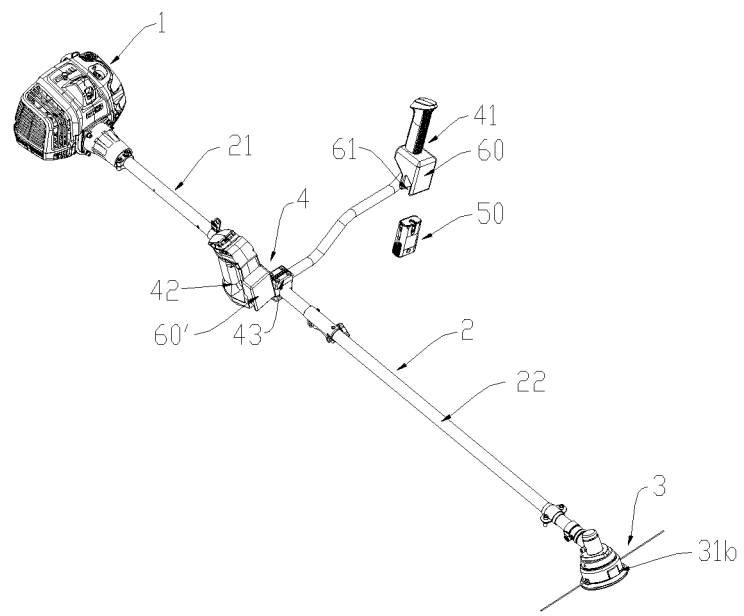
FIG. 12 is a perspective view of the garden tool provided in Embodiment 2.

As shown in FIG. 12, the battery pack mounting portion 60 is disposed on the left handle 41, the opening 611 of the accommodating chamber 61 faces downward, and the battery pack 50 is plugged into the battery pack mounting portion 60 from bottom to top.

In this Embodiment 2, the connecting rod assembly 2 includes a substantially rigid rear connecting rod 21 and a front connecting rod 22. Wherein, the rear connecting rod 21 is connected with the power component 1; the front end of the rear connecting rod 21 is slidably connected with the rear end of the front connecting rod 22, and the front end of the front connecting rod 22 is connected with the working head assembly 3. The rear connecting rod 21 and the front connecting rod 22 can slide relatively along the axis, so that the distance between the two ends of the connecting rod assembly 2 (namely the distance between the power assembly 1 and the working head assembly 3) is increased or decreased.

Further, the present embodiment can be modified. Specifically, another battery pack mounting portion 60' is provided on the right handle 42 of Embodiment 2, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing downward, instead of providing the battery pack mounting portion 60' on the right handle 42.

In this Embodiment 2, the working member 3a is a straw rope, and the garden tool is configured as a grass trimmer.

Other features of the present embodiment are substantially the same as those of Embodiment 1, and therefore will not be described again.

Embodiment 3

Figure 13:
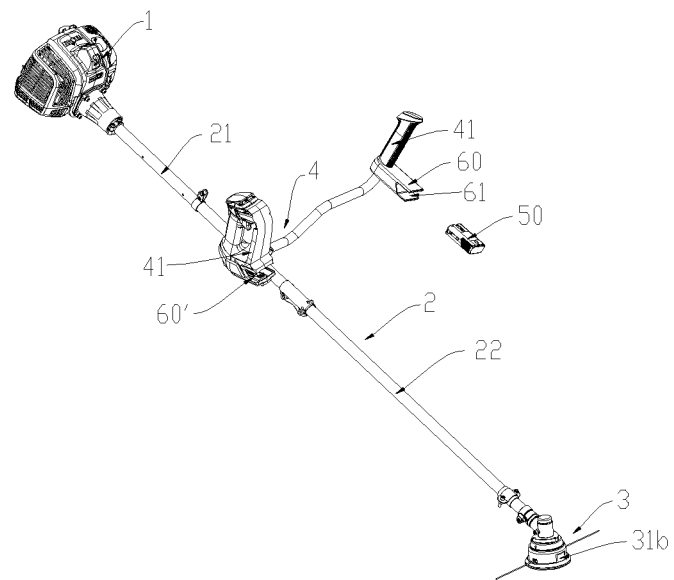
FIG. 13 is a perspective view of the garden tool provided in Embodiment 3.

As shown in FIG. 13, the present embodiment is different from Embodiment 2 in that the battery pack mounting portion 60 is disposed on the left handle 41, the opening 611 of the accommodating chamber 61 faces forward, and the battery pack 50 is plugged into the battery pack mounting portion 60 from front to rear.

Further, the present embodiment can be modified. Specifically, another battery pack mounting portion 60' is provided on the right handle 42 of the present embodiment, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing forward, instead of providing the battery pack mounting portion 60' on the right handle 42.

Other features of the present embodiment are substantially the same as those of Embodiment 2, and therefore will not be described again.

Embodiment 4

Figure 14:
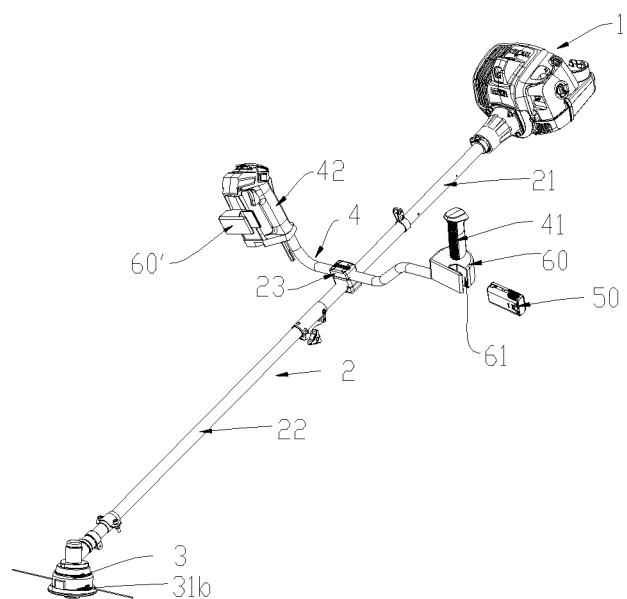
FIG. 14 is a perspective view of the garden tool provided in Embodiment 4.

As shown in FIG. 14, the present embodiment is different from Embodiment 2 in that the battery pack mounting portion 60 is disposed on the left handle 41, the opening 611 of the accommodating chamber 61 faces leftward, and the battery pack 50 is plugged into the battery pack mounting portion 60 from left to right.

Further, the present embodiment can be modified. Specifically, another battery pack mounting portion 60' is provided on the right handle 42 of the present embodiment, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing leftward, instead of providing the battery pack mounting portion 60' on the right handle 42.

Other features of the present embodiment are substantially the same as those of Embodiment 2, and therefore will not be described again.

Embodiment 5

Figure 15:
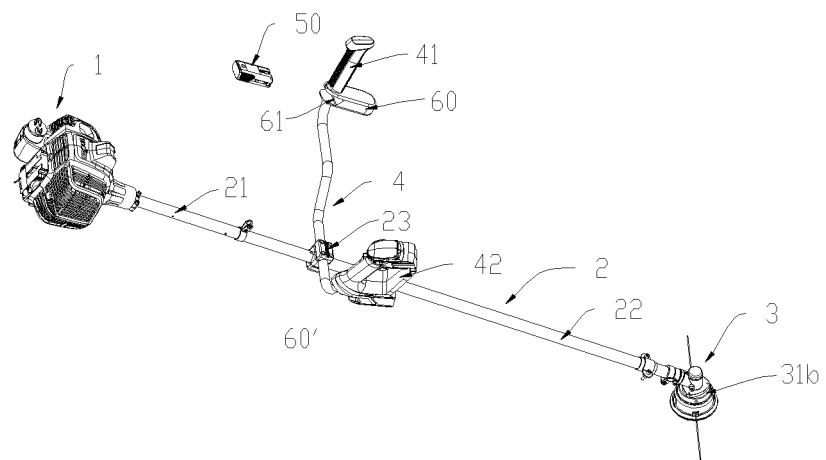
FIG. 15 is a perspective view of the garden tool provided in Embodiment 5.

As shown in FIG. 15, the present embodiment is different from Embodiment 2 in that the battery pack mounting portion 60 is disposed on the left handle 41, the opening 611 of the accommodating chamber 61 faces rearward, and the battery pack 50 is plugged into the battery pack mounting portion 60 from rear to front.

Further, the present embodiment can be modified. Specifically, another battery pack mounting portion 60' is provided on the right handle 42 of the present embodiment, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing rearward, instead of providing the battery pack mounting portion 60' on the right handle 42.

Other features of the present embodiment are substantially the same as those of Embodiment 2, and therefore will not be described again.

Embodiment 6

Figure 16:
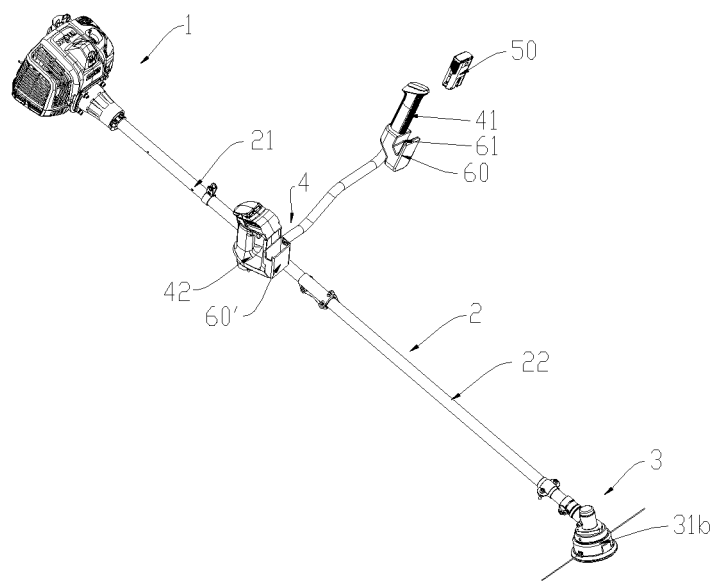
FIG. 16 is a perspective view of the garden tool provided in Embodiment 6.

As shown in FIG. 16, the present embodiment is different from Embodiment 2 in that the battery pack mounting portion 60 is disposed on the left handle 41, the opening 611 of the accommodating chamber 61 faces upward, and the battery pack 50 is plugged into the battery pack mounting portion 60 from top to bottom.

Further, the present embodiment can be modified. Specifically, another battery pack mounting portion 60' is provided on the right handle 42 of the present embodiment, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing upward, instead of providing the battery pack mounting portion 60' on the right handle 42.

Other features of the present embodiment are substantially the same as those of Embodiment 2, and therefore will not be described again.

Embodiment 7

Figure 17:
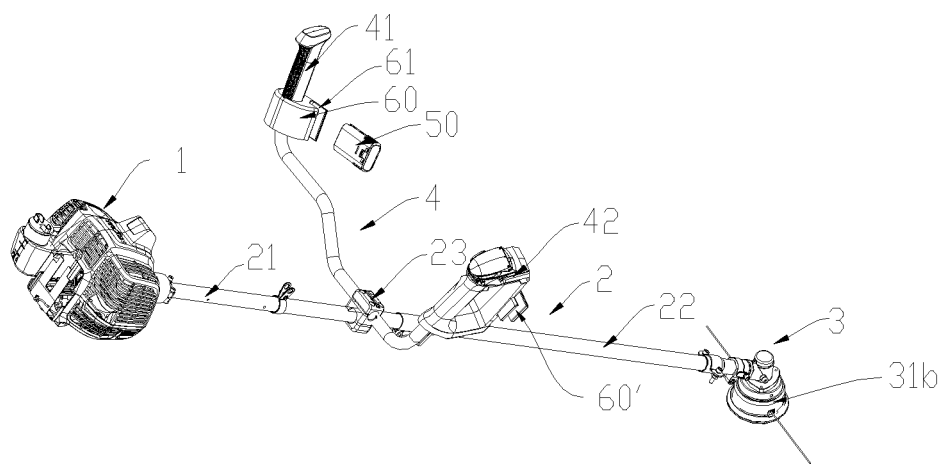
FIG. 17 is a perspective view of the garden tool provided in Embodiment 7.

As shown in FIG. 17, the present embodiment is different from Embodiment 2 in that the battery pack mounting portion 60 is disposed on the left handle 41, the opening 611 of the accommodating chamber 61 faces rightward, and the battery pack 50 is plugged into the battery pack mounting portion 60 from right to left.

Further, the present embodiment can be modified. Specifically, another battery pack mounting portion 60' is provided on the right handle 42 of the present embodiment, and the opening of the battery pack mounting portion 60' is oriented in the same direction as the opening of the battery pack mounting portion 60 on the left handle. The battery pack 50 may be alternatively plugged into the battery pack mounting portion 60 on the left handle or the battery pack mounting portion 60' on the right handle. In other embodiments, the opening orientation of the battery pack mounting portion 60' of the right handle is different from the orientation of the battery mounting portion 60 on the left handle.

As will be apparent to a person skilled in the art from the above description of the present embodiment, in other embodiments, the left handle 41 may separately be provided with the battery pack mounting portion 60 with the opening facing rightward, instead of providing the battery pack mounting portion 60' on the right handle 42.

Other features of the present embodiment are substantially the same as those of Embodiment 2, and therefore will not be described again.

Embodiment 8

Figure 18:
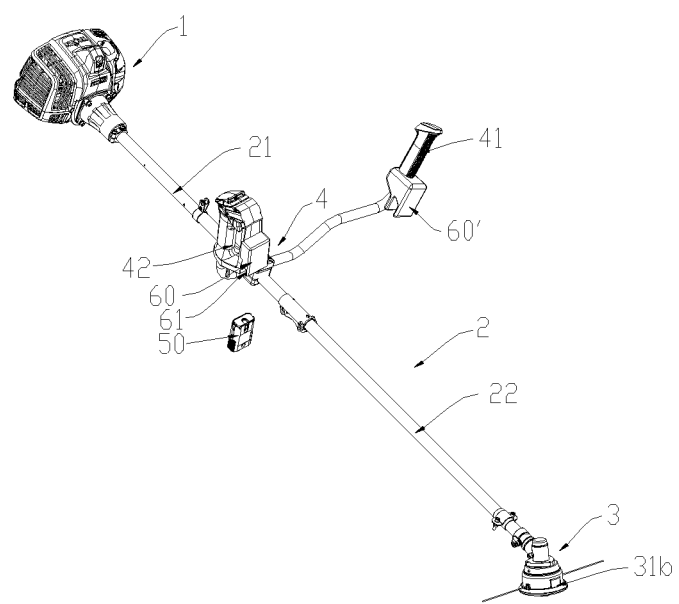
FIG. 18 is a perspective view of the garden tool provided in Embodiment 8.

As shown in FIG. 18, the present embodiment is different from Embodiment 2 in that the battery pack mounting portion 60 is disposed on the right handle 42, the opening 611 of the accommodating chamber 61 faces downward, and the battery pack 50 is plugged into the battery pack mounting portion 60 from bottom to top.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing downward, instead of providing the battery pack mounting portion 60' on the left handle 41.

Other features of the present embodiment are substantially the same as those of Embodiment 2, and therefore will not be described again.

Embodiment 9

Figure 19:
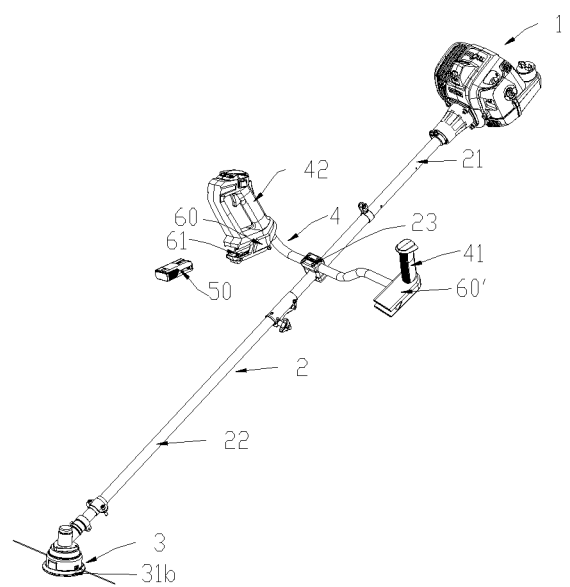
FIG. 19 is a perspective view of the garden tool provided in Embodiment 9.

As shown in FIG. 19, the present embodiment is different from Embodiment 8 in that the battery pack mounting portion 60 is disposed on the right handle 42, the opening 611 of the accommodating chamber 61 faces forward, and the battery pack 50 is plugged into the battery pack mounting portion 60 from front to back.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing frontward, instead of providing the battery pack mounting portion 60' on the left handle 41 (as the technical solution disclosed in Embodiment 1).

Other features of the present embodiment are substantially the same as those of Embodiment 8, and therefore will not be described again.

Embodiment 10

Figure 20:
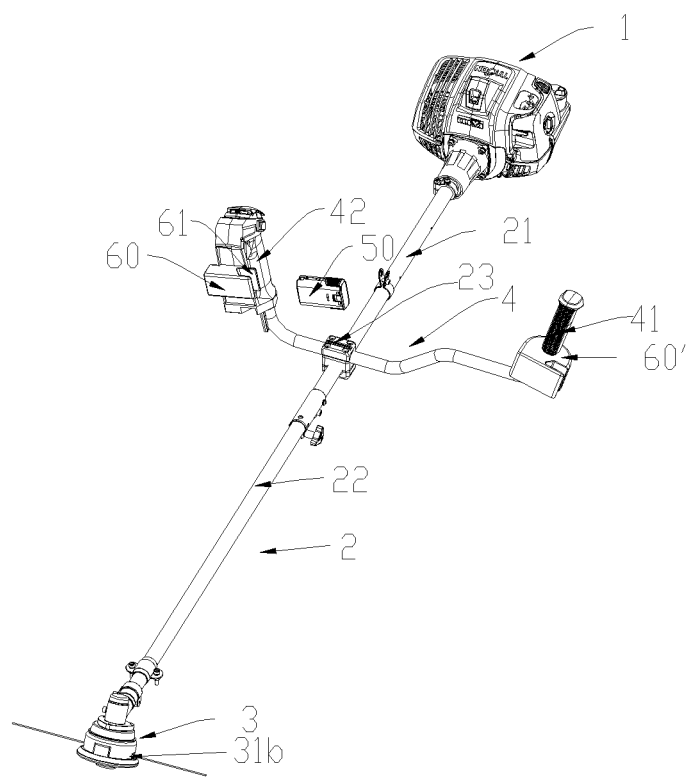
FIG. 20 is a perspective view of the garden tool provided in Embodiment 10.

As shown in FIG. 20, the present embodiment is different from Embodiment 8 in that the battery pack mounting portion 60 is disposed on the right handle 42, the opening 611 of the accommodating chamber 61 faces leftward, and the battery pack 50 is plugged into the battery pack mounting portion 60 from left to right.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing leftward, instead of providing the battery pack mounting portion 60' on the left handle 41.

Other features of the present embodiment are substantially the same as those of Embodiment 8, and therefore will not be described again.

Embodiment 11

Figure 21:
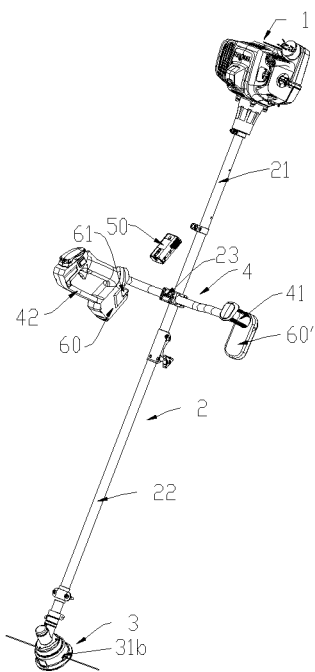
FIG. 21 is a perspective view of the garden tool provided in Embodiment 11.

As shown in FIG. 21, the present embodiment is different from Embodiment 8 in that the battery pack mounting portion 60 is disposed on the right handle 42, the opening 611 of the accommodating chamber 61 faces rearward, and the battery pack 50 is plugged into the battery pack mounting portion 60 from the rear to the front.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing rearward, instead of providing the battery pack mounting portion 60' on the left handle 41.

Other features of the present embodiment are substantially the same as those of Embodiment 8, and therefore will not be described again.

Embodiment 12

Figure 22:
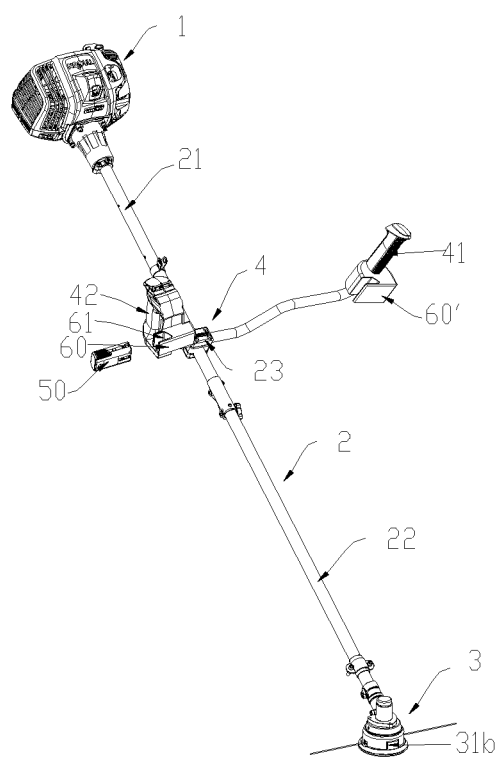
FIG. 22 is a perspective view of the garden tool provided in Embodiment 12.

As shown in FIG. 22, the present embodiment is different from Embodiment 8 in that the battery pack mounting portion 60 is disposed on the right handle 42, the opening 611 of the accommodating chamber 61 faces rightward, and the battery pack 50 is plugged into the battery pack mounting portion 60 from the right to the left.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing rightward, instead of providing the battery pack mounting portion 60' on the left handle 41.

Other features of the present embodiment are substantially the same as those of Embodiment 8, and therefore will not be described again.

Embodiment 13

Figure 23:
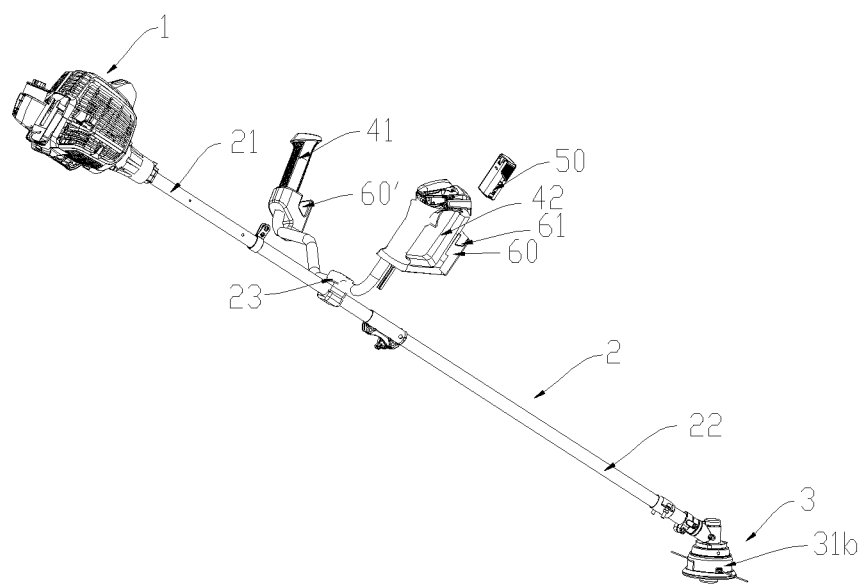
FIG. 23 is a perspective view of the garden tool provided in Embodiment 13.

As shown in FIG. 23, the present embodiment is different from Embodiment 8 in that the battery pack mounting portion 60 is disposed on the right handle 42, the opening 611 of the accommodating chamber 61 faces upward, and the battery pack 50 is plugged into the battery pack mounting portion 60 from top to bottom.

Further, the present embodiment can be modified. Specifically, another battery pack mounting portion 60' is provided on the left handle 41 of the present embodiment, and the opening of the battery pack mounting portion 60' is oriented in the same direction as the opening of the battery pack mounting portion 60 on the right handle. The battery pack 50 may be alternatively plugged into the battery pack mounting portion 60 on the right handle or the battery pack mounting portion 60' on the left handle. In other embodiments, the opening orientation of the battery pack mounting portion 60' of the left handle is different from the orientation of the battery mounting portion 60 on the right handle.

As will be apparent to a person skilled in the art from the above description of the present embodiment, in other embodiments, the right handle 42 may separately be provided with the battery pack mounting portion 60 with the opening facing upward, instead of providing the battery pack mounting portion 60' on the left handle 41.

Other features of the present embodiment are substantially the same as those of Embodiment 8, and therefore will not be described again.

It is to be understood that although the specification has been described in terms of embodiments, not every embodiment only contains one independent technical solution, and that such recitation is merely for purposes of clarity. A person skilled in the art should take the specification as a whole and the technical solution of each embodiment may be suitably combined to form additional embodiments that may be appreciated by a person skilled in the art.

The above detailed description is only specific to the possible embodiments of the present invention, and is not intended to limit the scope of the present invention, and all equivalent embodiments or modifications that do not depart from the spirit of the present invention are intended to be included within the scope of the present invention.

The invention claimed is:

1. A garden tool, comprising:
    a power assembly including an internal combustion engine having a starter motor;
    a battery pack for supplying power to the starter motor;
    a connecting rod assembly having two ends;
    a working head assembly, the working head assembly and the power assembly being respectively arranged at the two ends of the connecting rod assembly;
    a handle assembly including two handles, one of the handles being on a left side of the connecting rod assembly and another of the handles being on a right side of the connecting rod assembly, at least one of the handles including a grip portion and a battery pack mounting portion, the battery pack being detachably connected to the battery pack mounting portion;
    an accommodating chamber defined by the battery pack mounting portion, the battery pack being mounted on the battery pack mounting portion by being at least partially received in the accommodating chamber, the accommodating chamber defining an opening facing forward; and
    a circuit board disposed adjacent to the accommodating chamber, the circuit board including a substrate and an electrode holder disposed on a side of the substrate facing the accommodating chamber, the electrode holder including a clamping pin extending into the accommodating chamber.

2. The garden tool according to claim 1, wherein an upper end of the grip portion of at least one of the handles includes a control portion having at least one control key.

3. The garden tool according to claim 2, when the control portion includes an operation portion, and the control key is arranged on the operation portion, the control key including a start key and the operation portion further including a cover body capable of at least partially shielding the start key from being operated, the cover body being configured to be openable via an external force so that the start key can be operated.

4. The garden tool according to claim 3, wherein the cover is pivotally connected to the operation portion, and a reset element is located between the cover body and the operation portion, the reset element urging the cover body to move in a direction that would shield the start key.

5. The garden tool according to claim 1, wherein the handle on the right side of the connecting rod assembly includes a control portion and the battery pack mounting portion.

6. The garden tool according to claim 5, wherein the handle on the right side of the connecting rod assembly includes the grip portion, a front of the grip portion being spaced from a front shield plate, and a gap sized for a hand of an operator to pass through being formed between the grip portion and the front shield plate.

7. The garden tool according to claim 5, wherein the control portion is connected to an upper end of the grip portion, the battery pack mounting portion being connected to a lower end of the grip portion.

8. A garden tool, comprising:
- a power assembly comprising an internal combustion engine having a starter motor;
- a battery pack for supplying power to the starter motor;
- a connecting rod assembly having two ends;
- a working head assembly, the working head assembly and the power assembly being respectively arranged at the two ends of the connecting rod assembly;
- a handle assembly including two handles, one of the handles being on a left side of the connecting rod assembly, and another of the handles being on a right side of the connecting rod assembly, the battery pack being detachably assembled on at least one of the handles;
- an accommodating chamber defined by a battery pack mounting portion on at least one of the handles, the battery pack being mounted on the battery pack mounting portion by being at least partially received in the accommodating chamber, the accommodating chamber defining an opening facing forward; and
- a circuit board disposed adjacent to the accommodating chamber, the circuit board including a substrate and an electrode holder disposed on a side of the substrate facing the accommodating chamber, the electrode holder including a clamping pin extending into the accommodating chamber.

* * * * *